Feb. 2, 1960   E. L. COLLEDGE, JR   2,923,328
DRIVING HEAD FOR A LATHE
Filed July 8, 1958
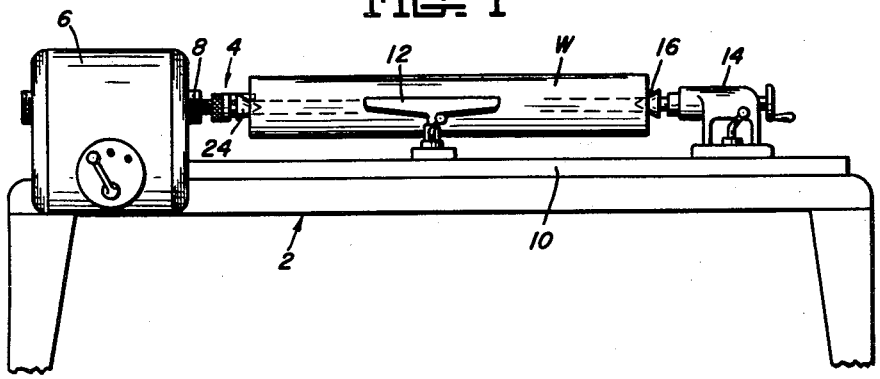
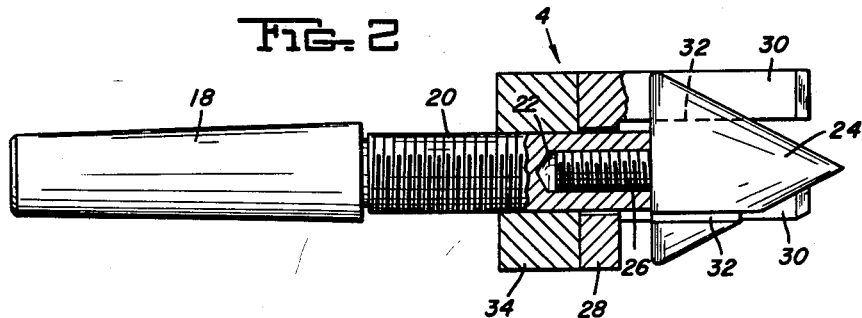
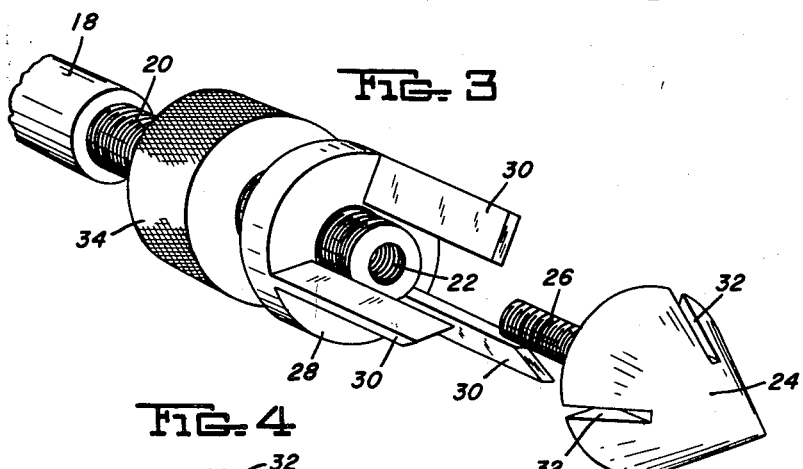
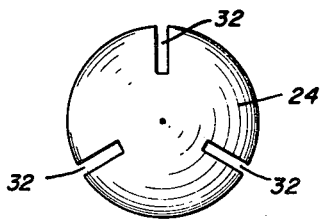
INVENTOR
EVAN L. COLLEDGE, Jr.
By Donald G. Dalton
Attorney

United States Patent Office 2,923,328
Patented Feb. 2, 1960

2,923,328
DRIVING HEAD FOR A LATHE

Evan L. Colledge, Jr., Lehi, Utah, assignor to United States Steel Corporation, a corporation of New Jersey Application July 8, 1958, Serial No. 747,175

2 Claims. (Cl. 142—53)

The present invention relates generally to the art of woodworking and more particularly to an improved driving head for rotating a bored workpiece in a wood turning lathe.

Prior to the present invention, the method utilized for producing wood turnings with bored or hollow centers included first turning the outside diameter of the workpiece to the desired limit, using a wood turning lathe, and then removing the workpiece from the lathe and drilling the center bore therethrough.

A major disadvantage inherent in this method was the difficulty experienced in drilling the center bore so that it was concentric with the outside diameter of the workpiece.

Accordingly, it is a primary object of the present invention to provide a novel driving head for a wood turning lathe whereby a workpiece can be turned after it has been center-bored to produce an outside diameter of desired dimension concentric with the center bore of the workpiece.

These and other objects will become more apparent after referring to the following specification and attached drawings, in which:

Figure 1 is a front elevational view of a wood turning lathe having the driving head of the invention installed thereon;

Figure 2 is a side elevational view partly in section of the device of the invention;

Figure 3 is a perspective view partly exploded of the device of the invention; and Figure 4 is a front end view of the centering cone of the invention.

Referring more particularly to the drawings reference numeral 2 designates a wood turning lathe having the driving head of the invention, designated generally by reference numeral 4, installed thereon. The lathe 2, which is conventional except for the driving head of the invention, includes an electric drive motor 6 for driving a lathe spindle 8; a lathe bed 10 on which a tool rest 12 and tail stock 14 are adjustably mounted; and a dead center 16 mounted on the tail stock. A center-bored workpiece W is shown mounted on the lathe between the driving head 4 and dead center 16.

The driving head 4 of the invention includes a tapered shank 18 adapted to be received in the lathe spindle 8 for rotation therewith. A threaded stud 20 having a drilled and tapped hole 22 in its outer end is integral with and projects coaxially from the shank 18. A centering cone 24 having a threaded shank 26 projecting from the base thereof is attached to the stud 20 with the shaft 26 threaded into the drilled and tapped hole 22. A clutch ring 28 having three prongs 30 projecting axially therefrom is slidably mounted on the stud 20 adjacent the base of the centering cone 24. The prongs 30 are received in longitudinal slots 32 in the periphery of cone 24 and normally have their outer ends spaced radially about the apex of the cone 24. A locking nut 34 is threaded on the stud 20 and functions to secure the clutch 28 against axial movement along the stud 20 when the prongs 30 are imbedded in the end of the workpiece W.

In operation, the driving head 4 is mounted on the lathe by inserting the shank 18 in the lathe spindle 8 and securing it therein by conventional locking means. Then the locking nut 34 is threadingly advanced along the stud 20 toward the shank 18 and the clutch ring 28 is slipped on the stud adjacent the locking nut 34. In this position the prongs 30 are remote from the drilled and tapped end of the stud 18 so that they will not interfere with the installation of the centering cone 24 onto the stud. The centering cone is then attached by threading its shaft 26 into the drilled and tapped hole 22. The center-bored workpiece W is then mounted on the lathe supported by the dead center 16 and centering cone 24. The tail stock 14 is adjusted along the lathe bed in the conventional manner so that the dead center 16 and apex end of cone 24 are received in opposite ends of the center bore of the workpiece W. As the workpiece is thus positioned the centering cone will seek an axis common with the centerline of the workpiece center bore so that the centering cone will be coaxial with the center bore. After the workpiece has thus been mounted, the locking nut 34 is threadingly advanced toward the outer end of the stud 18 to advance the clutch ring 28 toward the workpiece W and position the prongs 30 within the slots 32. As the clutch ring is advanced the ends of the prongs 30 are imbedded in the end of the workpiece surrounding the central bore therein, as best shown in Figure 1. Then, the operation of turning the outside diameter of the workpiece with a tool (not shown) supported on the tool rest 12 can be effected by driving the lathe spindle which, in turn, rotates the workpiece W through the prongs 30. Since the centering cone is positioned coaxially with the centerline of the center bore of the workpiece, the outside diameter of the workpiece will be turned concentrically with its center bore as the workpiece is rotated by the driving head of the invention.

While one embodiment of my invention has been shown and described, it will be apparent that other adaptations and modifications may be made without departing from the scope of the following claims.

I claim:
1. A driving head for a lathe having a spindle comprising a shank capable of being fitted coaxially in one end of said spindle for rotation therewith, an externally threaded stud projecting coaxially from said shank, a workpiece-engaging centering cone at the free end of said stud, a ring loose on said stud intermediate said cone and said shank, a series of radially spaced prongs projecting from said ring in the direction toward said centering cone parallel with said stud, said prongs having tapered free ends for engaging the end of a workpiece engaged by said centering cone, and nut means threaded on said stud for adjustably positioning said ring axially along said stud.

2. A driving head as defined by claim 1 characterized by said centering cone having lengthwise slots about its periphery for receiving said prongs.

References Cited in the file of this patent

UNITED STATES PATENTS

| 1,246,697 | Archer | Nov. 13, 1917 |
| 2,333,055 | Terrell | Oct. 26, 1943 |

FOREIGN PATENTS

| 100,805 | Germany | Mar. 17, 1898 |